US012666511B2

(12) United States Patent
Dai

(10) Patent No.: US 12,666,511 B2
(45) Date of Patent: Jun. 23, 2026

(54) LIGHTING SYSTEM CONTROLLER, TRACK, AND LIGHTING SYSTEM

(71) Applicants: SUZHOU OPPLE LIGHTING CO., LTD., Suzhou City (CN); OPPLE LIGHTING CO., LTD., Shanghai (CN)

(72) Inventor: Qin Dai, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 45 days.

(21) Appl. No.: 18/953,419

(22) Filed: Nov. 20, 2024

(65) Prior Publication Data

US 2025/0159782 A1 May 15, 2025

Related U.S. Application Data

(63) Continuation of application No. PCT/CN2023/094402, filed on May 16, 2023.

(30) Foreign Application Priority Data

May 20, 2022 (CN) ........................ 202210555262.9
May 20, 2022 (CN) ........................ 202221220658.X

(51) Int. Cl.
*H05B 45/325* (2020.01)
*F21V 21/35* (2006.01)
(Continued)

(52) U.S. Cl.
CPC ........... *H05B 45/325* (2020.01); *F21V 21/35* (2013.01); *F21V 23/02* (2013.01); *F21V 23/06* (2013.01); *H05B 47/183* (2024.01)

(58) Field of Classification Search
CPC .... H05B 45/325; H05B 47/183; H05B 47/18; F21V 21/35; F21V 23/02; F21V 23/06
See application file for complete search history.

(56) References Cited

U.S. PATENT DOCUMENTS 8,755,305 B2 * 6/2014 Altekar ................ H01R 25/142 370/254
9,291,338 B2 * 3/2016 Liu ......................... F21V 21/35
(Continued)

FOREIGN PATENT DOCUMENTS

CA 2657774 A1 * 3/2010 ........... H05B 47/155
CN 106714424 A 5/2017
(Continued)

OTHER PUBLICATIONS

International Search Report of PCT/CN2023/094402 dated Aug. 16, 2023 with English translation.

*Primary Examiner* — Adam D Houston
(74) *Attorney, Agent, or Firm* — Arch & Lake LLP; Hao Tan; Shen Wang

(57) ABSTRACT

Provided in the present disclosure are a lighting system controller, a track, and a lighting system. The lighting system controller comprises a power supply module, a processor, a control module, which is used for generating or processing a first control signal, a first communication interface, a second communication interface, a detection circuit, and an analysis circuit, where the second communication interface receives a second control signal or a third control signal input, which is converted into a first control signal by means of the detection circuit, the analysis circuit and the processor, after which the first control signal is output from the first communication interface.

14 Claims, 6 Drawing Sheets

(51) Int. Cl.

| | |
|---|---|
| ***F21V 23/02*** | (2006.01) |
| ***F21V 23/06*** | (2006.01) |
| ***H05B 47/18*** | (2020.01) |

(56) References Cited

U.S. PATENT DOCUMENTS

| | | | | |
|---|---|---|---|---|
| 9,353,913 | B2 * | 5/2016 | Allen | H05B 47/10 |
| 10,305,236 | B2 * | 5/2019 | De Gier | H01R 25/145 |
| 10,627,083 | B2 * | 4/2020 | Tuchler | H01R 13/6205 |
| 10,845,043 | B2 * | 11/2020 | Tuchler | F21V 17/02 |
| 11,187,389 | B2 * | 11/2021 | Leonardo | H01R 25/142 |
| 11,608,967 | B2 * | 3/2023 | Béland | F21V 21/35 |
| 11,608,969 | B2 * | 3/2023 | Yaphe | F21S 2/00 |
| 11,920,767 | B2 * | 3/2024 | Puvanakijjakorn | H05B 47/11 |
| 12,169,060 | B1 * | 12/2024 | Jiang | H05B 47/18 |
| 12,241,615 | B1 * | 3/2025 | Béland | F21V 21/045 |
| 2005/0169015 | A1 * | 8/2005 | Luk | H05B 45/20<br>362/648 |
| 2009/0284988 | A1 * | 11/2009 | Snagel | F21V 21/35<br>362/648 |
| 2010/0321929 | A1 * | 12/2010 | Ramirez | F21V 21/35<br>362/147 |
| 2013/0200803 | A1 * | 8/2013 | Boekle | H05B 47/10<br>315/127 |
| 2025/0030328 | A1 * | 1/2025 | Li | H02M 1/088 |
| 2025/0122984 | A1 * | 4/2025 | Yang | H05B 45/20 |
| 2025/0275042 | A1 * | 8/2025 | Green | H05B 45/10 |

FOREIGN PATENT DOCUMENTS

| | | | |
|---|---|---|---|
| CN | 111586919 | A | 8/2020 |
| CN | 215773666 | U | 2/2022 |
| CN | 115151001 | A | 10/2022 |
| EP | 3751965 | A1 | 12/2020 |
| WO | 2016115642 | A1 | 7/2016 |

* cited by examiner

LIGHTING SYSTEM CONTROLLER, TRACK, AND LIGHTING SYSTEM

CROSS-REFERENCE TO RELATED APPLICATIONS

This application is based upon and claims the priority of PCT patent application No. PCT/CN2023/094402 filed on May 16, 2023 which claims priority to the Chinese patent application No. 202210555262.9 filed on May 20, 2022 and the Chinese patent application No. 202221220658.X filed on May 20, 2022, the entire contents of which are hereby incorporated by reference herein for all purposes.

TECHNICAL FIELD

The present disclosure relates to a field of lighting technology, and in particular to a lighting system controller, a track and a lighting system.

BACKGROUND

Digital lighting technology has features of being easy to control and maintain, and the like. It meets people's needs for energy conservation and emission reduction as well as intelligent management, and has been widely valued in the fields of industrial lighting and commercial lighting.

SUMMARY

The disclosure provides a lighting system controller, a track and a lighting system.

According to one aspect, a lighting system controller is provided. The lighting system controller may include: a power supply module, a processor, a control module, which is used for generating a first control signal or processing the first control signal, and a first communication interface, the first communication interface being connected to the control module and an external control bus, the controller may include:

- a second communication interface, being used to receive a second control signal or a third control signal;
- a detection circuit, being connected to the second communication interface and the processor, the detection circuit outputs a determination signal to the processor according to a type of a signal received by the second communication interface; the processor performs subsequent processing according to the determination signal; if it is determined that the signal received by the second communication interface is the second control signal, then the detection circuit also converts the second control signal, and the processor receives a signal obtained after the detection circuit converting the second control signal, and then the processor converts the signal into a first control signal and transmits the first control signal to the control module; and
- an analytic circuit, being connected to the second communication interface and the processor, if it is determined that the signal received by the second communication interface is the third control signal, then the processor receives a signal obtained after the analytic circuit converting the third control signal, and then the processor converts the signal into a first control signal and transmits the first control signal to the control module;
- upon second communication interface being input with the second control signal or the third control signal, the control module transmits the first control signal transmitted from the processor to the first communication interface, or otherwise, a first control signal generated by the control module itself is transmitted to the first communication interface.

The present disclosure also provides a track, the track may include a track body and a first conductive bar, a second conductive bar and a third conductive bar arranged along an extension direction of the track body, the first conductive bar is configured to transmit a first control signal, the second conductive bar is configured to transmit a second control signal and a third control signal, the third conductive bar is configured for power supply, the lighting system controller as mentioned above is connected to the track body, the first communication interface is electrically connected to the first conductive bar, and the second communication interface is electrically connected to the second conductive bar.

The present disclosure further provides a lighting system, the lighting system may include the track as mentioned above, the lighting system controller as mentioned above and at least one lighting unit, the lighting system controller is connected to the track body, the first communication interface is electrically connected to the first conductive bar, the second communication interface is electrically connected to the second conductive bar, the lighting unit is disposed on the track body, the lighting unit is electrically connected to the third conductive bar to receive the power supply, and the lighting unit is electrically connected to the first conductive bar to receive a first control signal outputted by the first communication interface and respond to the first control signal.

It is to be understood that both the foregoing general description and the following detailed description are exemplary and explanatory only and are not restrictive of the present disclosure.

BRIEF DESCRIPTION OF DRAWINGS

Hereinbelow, the technical solutions and other beneficial effects of the present disclosure will be made obvious through the detailed description of the specific implementation of the present disclosure in combination with the attached drawings.

DETAILED DESCRIPTION

As a standard communication interface and protocol, a Digital Addressable Lighting Interface (DALI) has been widely used in the lighting engineering with the logarithmic dimming curve and the gradient adjustment effect conforming to the human visual effect and with a rich dimming instruction set. The DALI protocol is established based on the master-slave control mode, in which a master controller and a lighting apparatus are included and dimming control is performed on the lighting apparatus by the master controller.

In most of track light products at present, a DALI controller uses a track wire as a DALI bus to dim and tone a lamp to achieve track combined adjusting. However, when the lighting system is reformed, it is necessary to dock some other existing control systems. For example, the original track system is under PWM control or 0-10 volts control, and the new track system and the old track system cannot be directly connected due to different control protocols and thus cannot be controlled in a unified way. Therefore, how to simply and efficiently expand the existing track lighting systems and realize unified control of the different track systems has become an urgent problem to be solved.

A lighting system controller, a track and a lighting system proposed in this disclosure will be further described in detail in combination with the attached drawings and examples hereinbelow.

Figure 1:
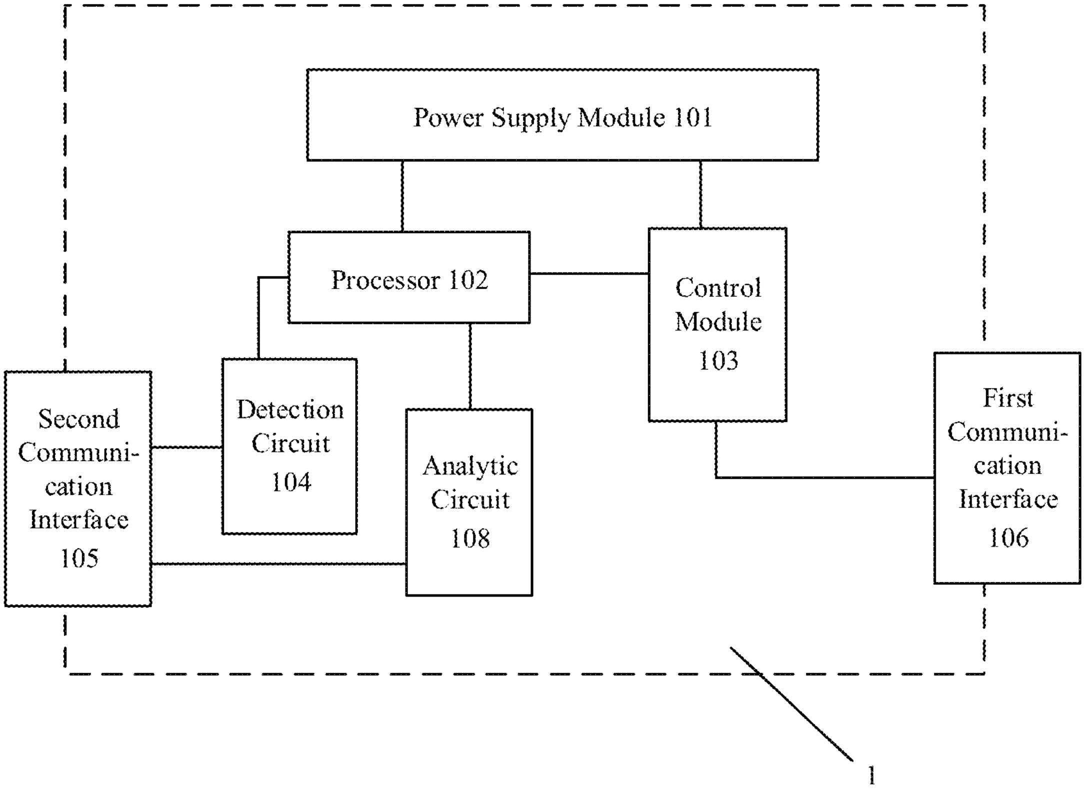
FIG. 1 is a structure schematic diagram of a controller of an example of the present disclosure.

FIG. 1 shows a lighting system controller 1 of an example of the present disclosure, which includes a power supply module 101, a processor 102, a control module 103 and a first communication interface 106. The above part is the same as an existing controller, where the power supply module 101 supplies power to the processor 102 and the control module 103, the control module 103 can generate a first control signal or process the first control signal, and the first control signal is connected to an external control bus through the first communication interface 106 so as to control a controlled device. Lamp control generally complies with a certain protocol. The lighting system controller 1 of the example of the present disclosure is applied to a track lighting system, so a wired protocol is adopted. In this example, the first control signal is a DALI control signal, the control module 103 is a DALI master, an outside of the first communication interface 106 is connected to a DALI bus, and the lighting system controller 1 controls DALI lamps connected to the bus.

When a user purchases the DALI lamps, because the existing lighting control system is of PWM control or 0-10 volts control, the DALI lamps cannot be integrated into the existing system to be controlled in a unified way. The above module realizes all the functions of the traditional DALI controller. The improvement of the present disclosure is that the lighting system controller 1 also includes a second communication interface 105, a detection circuit 104 and an analytic circuit 108. The second communication interface 105 can receive a second control signal or a third control signal. That is, the lighting system controller 1 in the present disclosure can be compatible with two different control signals at the same time, and upon the lighting system controller 1 being input with different signals, the detection circuit 104 firstly determines what kind of signal is inputted. The detection circuit 104 is connected to the second communication interface 105 and the processor 102. The detection circuit 104 outputs the determination signal to the processor 102 according to a type of a signal received by the second communication interface 105, and the processor 102 analyzes the determination signal and then performs subsequent processing. If it is determined that the signal received by the second communication interface 105 is the second control signal, the processor 102 receives a signal obtained after the detection circuit 104 converts the second control signal, and then converts the signal into a first control signal and transmits the first control signal to the control module 103. If it is determined that the signal received by the second communication interface 105 is the second control signal is, the processor 102 receives a signal obtained after the detection circuit 104 converting the second control signal, and then converts the signal into a first control signal and transmits the first control signal to the control module 103. If it is determined that the signal received by the second communication interface 105 is the third control signal, then the processor 102 receives a signal obtained after the analytic circuit 108 converting the third control signal, and then the processor converts the signal into a first control signal and transmits the first control signal to the control module 103. Upon second communication interface 105 being input with the second control signal or the third control signal, the control module 103 transmits the first control signal transmitted from the processor 102 to the first communication interface 106. Since the first communication interface 106 is connected to the DALI bus, the lamps are all those controlled according to the DALI protocol, and the lighting system controller 1 proposed in the present disclosure realizes the control of other lamp control signals on the DALI lamps. In other examples, it may also be converted to other wired protocols such as DMX, which is not limited in the present disclosure. On the contrary, upon second communication interface 105 being input with no signal, the lighting system controller 1 is still used as an independent controller, and the first communication interface 106 outputs the first control signal generated by the control module 103 so as to control connected lamps.

In this example, the second control signal is a PWM control signal, and the third control signal is a 0-10 volts control signal. That is, the lighting system controller 1 can also be compatible with these two control signals and convert them into DALI signals to control the DALI lamps.

Figure 2:
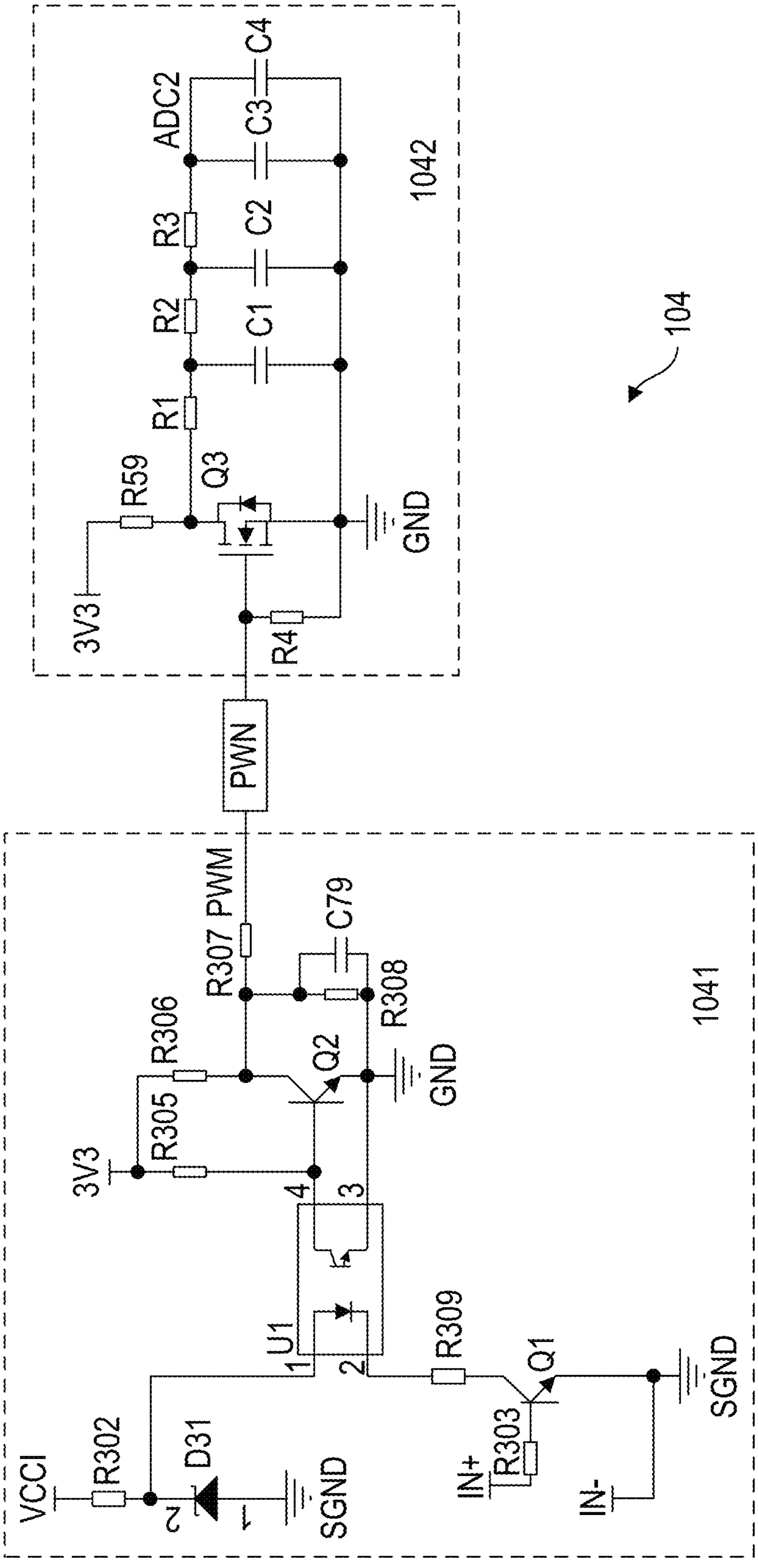
FIG. 2 is a circuit diagram of a detection circuit in a controller of an example of the present disclosure.

The specific circuit diagram of the detection circuit 104 in this example is shown in FIG. 2. The detection circuit 104 includes a first isolation circuit 1041 and a first conversion circuit 1042. The second communication interface 105 is connected to the isolation circuit 1041, and the input signals labeled IN+ and IN− of the second communication interface 105 in the diagram are outputted at a PWM terminal after being processed by the isolation circuit 1041. The PWM terminal is connected to the processor 102 and outputs a determination signal to the processor 102. The first conversion circuit 1042 is connected to the PWM terminal and converts a signal of the PWM terminal into a signal that can be processed by the processor 102, and the signal is outputted from an output terminal ADC2.

As shown in FIG. 2, the isolation circuit 1041 includes a first optocoupler U1. A terminal of an input side of the first optocoupler U1 is pulled up at a supply voltage VCC1 through a first resistor R302, and is grounded through a first voltage regulator diode D33, and another terminal of the input side of the first optocoupler U1 is connected to a collector of a first triode Q1 through a second resistor R309. A base of the first triode Q1 is connected to the input signals IN+ and IN− through a third resistor R303. An emitter of the first triode Q1 is grounded. The input signals IN+ and IN− are inputted by the second communication interface 105. A terminal of an output side of the first optocoupler U1 is connected to a base of a second triode Q2. A fourth resistor R305 is connected to a high level of 3.3V and the base of the second triode Q2. A fifth resistor R306 is connected to a high level of 3.3V and a collector of the second triode Q2. A sixth resistor R308 and a first capacitor C79 are connected in parallel between the collector of the second triode Q2 and an emitter of the second triode Q2. A seventh resistor R307 is connected between the collector of the second triode Q2 and the PWM terminal. Another terminal of the output side of the first optocoupler U1 and the emitter of the second triode Q2 are grounded.

In this example, the high level is 3.3V on average. In other examples, the high level can be set according to the requirements of the chip. The PWM terminal is connected to the processor 102, and the processor 102 determines whether it is a 0-10 volts signal or a PWM signal to confirm the input according to whether it is the high level or the PWM waveform transmitted from the PWM terminal. Upon second communication interface 105 being input with the third control signal, which is a 0-10 volts signal in this example, the high level is outputted at the PWM terminal after isolation of the first optocoupler U1. Upon second communication interface 105 being input with the second control signal, which is a PWM signal in this example, the PWM waveform is outputted at the PWM terminal, and the controller 102 determines the PWM signal according to the waveform. The PWM waveform of 3.3V outputted at the PWM terminal is converted by the first conversion circuit 1042 into a level waveform which can be accepted by the processor 102, and the level waveform is outputted from the output terminal ADC2. The level waveform is received by the processor 102 and then converted into a DALI signal. Then, a downstream DALI lamp is dimmed synchronously through the controller 103, thereby achieving the effect of converting PWM dimming to DALI dimming.

The first conversion circuit 1042 includes an MOS transistor Q3. A gate of the MOS transistor Q3 is connected to the PWM terminal. A twelfth resistor R4 is connected between the gate of the MOS transistor Q3 and the ground. A source of the MOS transistor Q3 is grounded, and a drain of the MOS transistor Q3 is pulled up at the high level of 3.3V through a thirteenth resistor R59. Also, a fourteenth resistor R1, a fifteenth resistor R2 and a sixteenth resistor R3 are connected in series in sequence connected between the drain of the MOS transistor Q3 and the output terminal ADC2 of the first conversion circuit 1042. A terminal of a second capacitor C1 is connected to a connection point of the fourteenth resistor R1 and the fifteenth resistor R2 and another terminal of the second capacitor C1 is grounded. A terminal of a third capacitor C2 is connected to a connection point of the fifteenth resistor R2 and the sixteenth resistor R3 and another terminal of the third capacitor C2 is grounded. A fourth capacitor C3 and a fifth capacitor C4 are connected in parallel between the output terminal ADC2 of the first conversion circuit 1042 and the ground.

Figure 3:
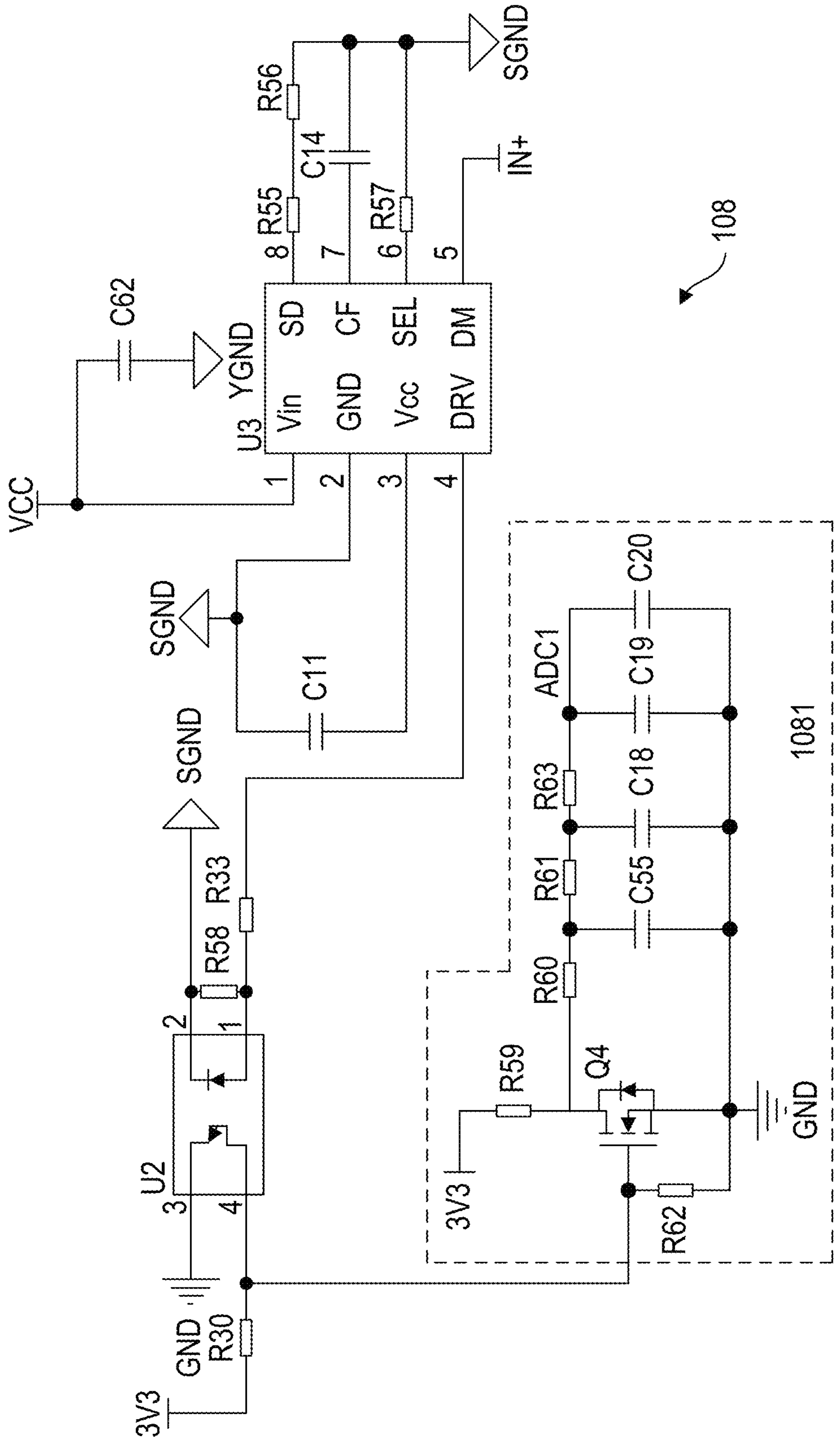
FIG. 3 is a circuit diagram of an analytic circuit in a controller of an example of the present disclosure.

The analytic circuit 108 in this example is shown in FIG. 3. The analytic circuit 108 includes a first chip U3, and the input signal of the second communication interface 105 is connected to a pin 5 of the first chip U3. Upon the signal being a 0-10 volts signal, the first chip U3 outputs the corresponding duty cycle PWM signal at its pin 4 according to the 0-10 volts level. The pin 4 of the first chip U3 is connected to a terminal of an input side of a second optocoupler U2 through an eighth resistor R33, another terminal of the input side of the second optocoupler U2 is grounded, and a ninth resistor R58 is also connected between the terminal of the input side of the second optocoupler U2 and the another terminal of the input side of the second optocoupler U2. A terminal of an output side of the second optocoupler U2 is connected to a second conversion circuit 1081 and also pulled up at a high level of 3.3V through an eleventh resistor R30, another terminal of the output side of the second optocoupler U2 is grounded. The second conversion circuit 1081 converts a received PWM waveform into a level signal that can be processed by the processor 102, and the level signal is outputted by an output terminal ADC1.

In this example, the second conversion circuit 1081 has the same structure and function as the first conversion circuit 1042. The second conversion circuit 1081 includes an MOS transistor Q4. A gate of the MOS transistor Q4 is connected to the terminal of the output side of the second optocoupler U2. A twelfth resistor R62 is connected between the gate of the MOS transistor Q4 and the ground. A source of the MOS transistor Q4 is grounded, and a drain of the MOS transistor Q4 is pulled up at a high level of 3.3V through a thirteenth resistor R59. Also, a fourteenth resistor R60, a fifteenth resistor R61 and a sixteenth resistor R63 are connected in series in sequence between the drain of the MOS transistor Q4 and the output terminal ADC1 of the second conversion circuit 1081. A terminal of a second capacitor C55 is connected to a connection point of the fourteenth resistor R60 and the fifteenth resistor R61 and another terminal of the second capacitor C55 is grounded. A terminal of a third capacitor C18 is connected to a connection point of the fifteenth resistor R61 and the sixteenth resistor R63 and another terminal of the third capacitor C18 is grounded. A fourth capacitor C19 and a fifth capacitor C20 are connected in parallel between the output terminal ADC1 of the second conversion circuit 1081 and the ground.

Figure 4:
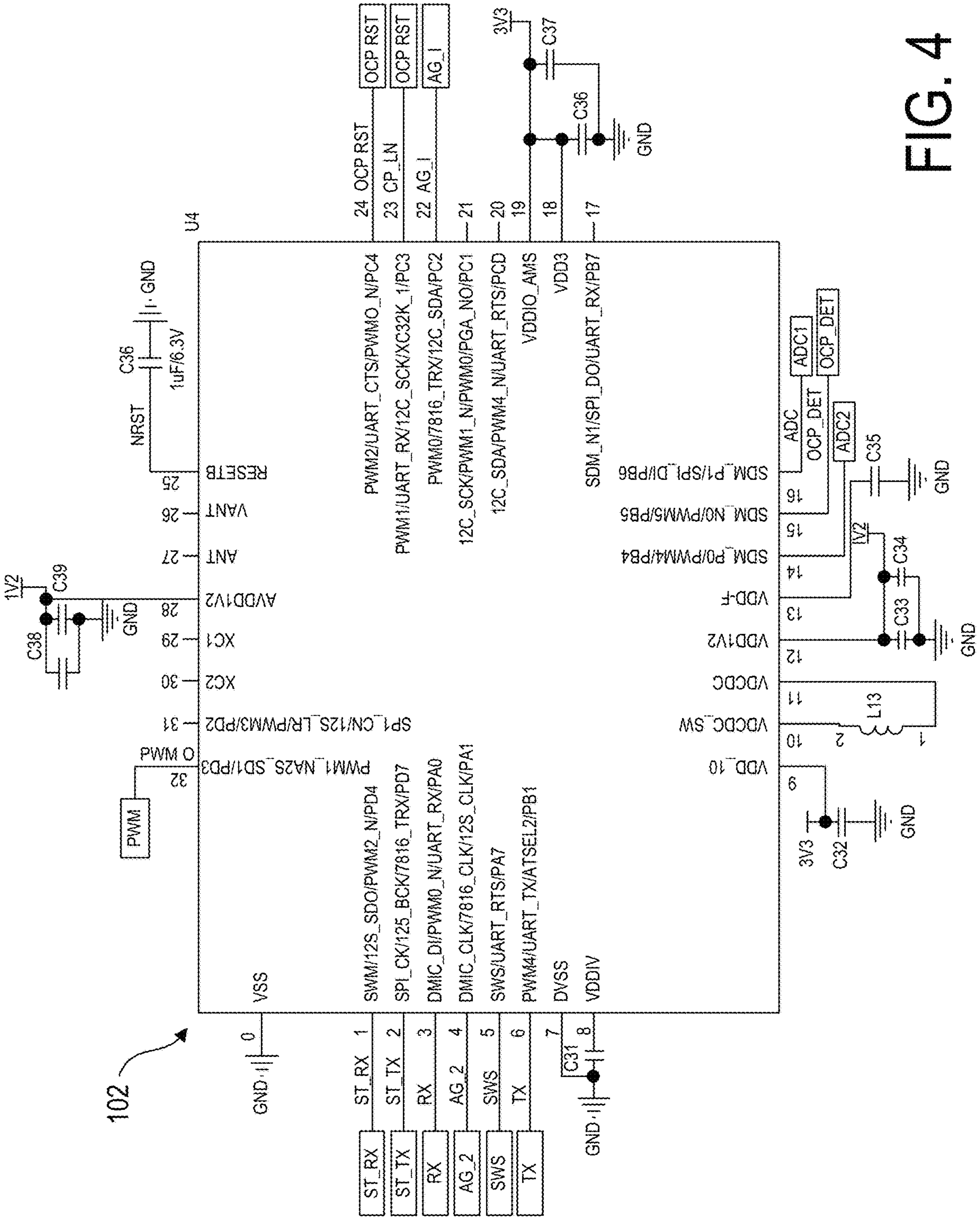
FIG. 4 is a peripheral circuit diagram of a processor in a controller of an example of the present disclosure.

The processor 102 in this example is an MCU chip as shown in FIG. 4. The PWM terminal of the detection circuit 104 is connected to a pin 32, the output terminal ADC1 of the second conversion circuit 1081 is connected to a pin 16, and the output terminal ADC2 of the first conversion circuit 1042 is connected to a pin 14. In other examples, the numbers of the pins may vary with the model of the MCU chip, which is not limited in the present disclosure. Upon the PWM terminal of the detection circuit 104 being transmitted with the high level, the MCU determines that the input of the second communication interface 105 is a 0-10 volts signal, receives the signal which is transmitted from the output terminal ADC1 of the second conversion circuit 1081 to the pin 16, and converts the signal into a DALI signal. Upon the PWM terminal of the detection circuit 104 being transmitted with the PWM waveform, the MCU determines that the input of the second communication interface 105 is a PWM signal, receives the signal which is transmitted from the output terminal ADC2 of the first conversion circuit 1042 to the pin 14, and converts the signal into a DALI signal. Upon no signal being received by the second communication interface 105, the PWM terminal of the detection circuit 104 has no signal output, the lighting system controller 1, as an independent DALI controller, directly outputs the control signal to the first communication interface 106 and its subordinate lamps by the control module 103.

Figure 5:
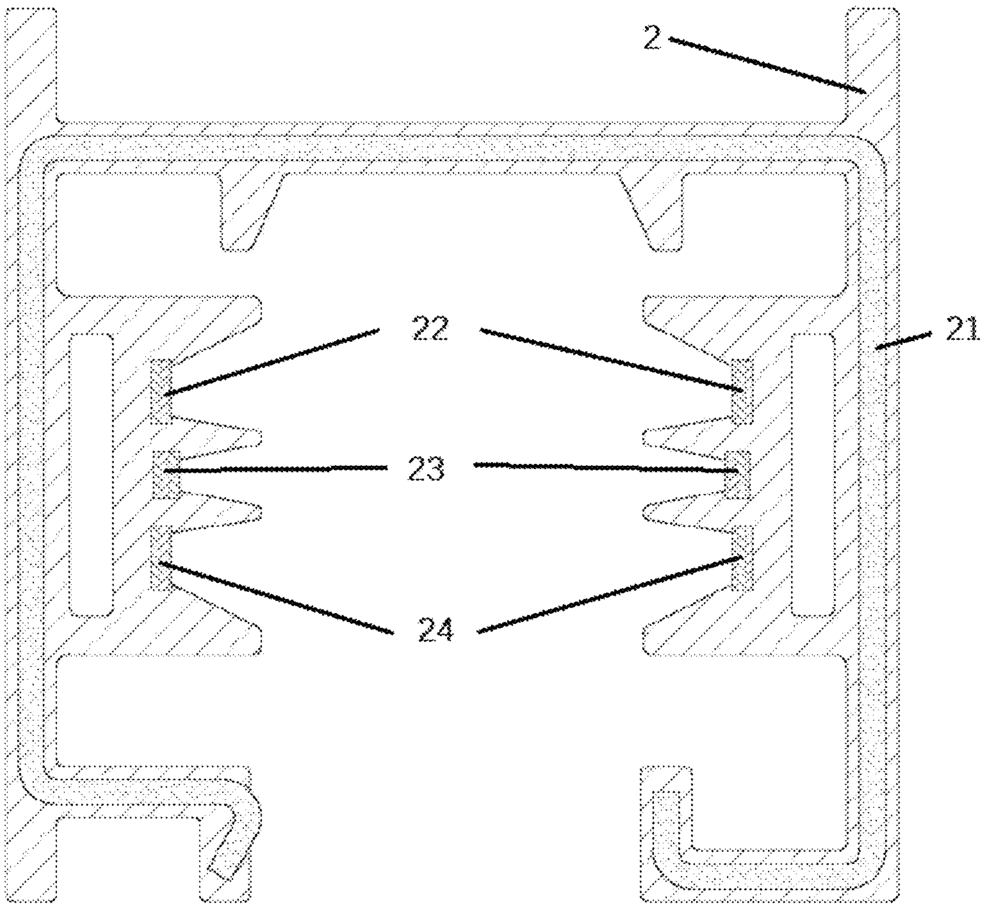
FIG. 5 is a sectional structure schematic diagram of a track of an example of the present disclosure.

The aforesaid lighting system controller 1 can be used in any form of wired lighting control system. In an example, the lighting system controller 1 is connected to a track 2, a sectional diagram of which is shown in FIG. 5. The track 2 includes a track body 21 and a first conductive bar 22, a second conductive bar 24 and a third conductive bar 23 arranged along an extension direction of the track body 21. The first conductive bar 22 is configured to transmit a first control signal, the second conductive bar 24 is configured to transmit a second control signal or a third control signal, and the third conductive bar 23 is configured for power supply. The lighting system controller 1 is disposed on the track body 21, the first communication interface 106 of the lighting system controller 1 is electrically connected to the first conductive bar 22, and the second communication interface 105 is electrically connected to the second conductive bar 24. In this example, the lighting system controller 1 is directly disposed on the track body 21. In other examples, the lighting system controller 1 may also be disposed outside the track body 21, and wires are used to connect the first communication interface 106 and the first conductive bar 22 and connect the second communication interface 105 and the second conductive bar 24, which is not limited in the present disclosure.

Figure 6:
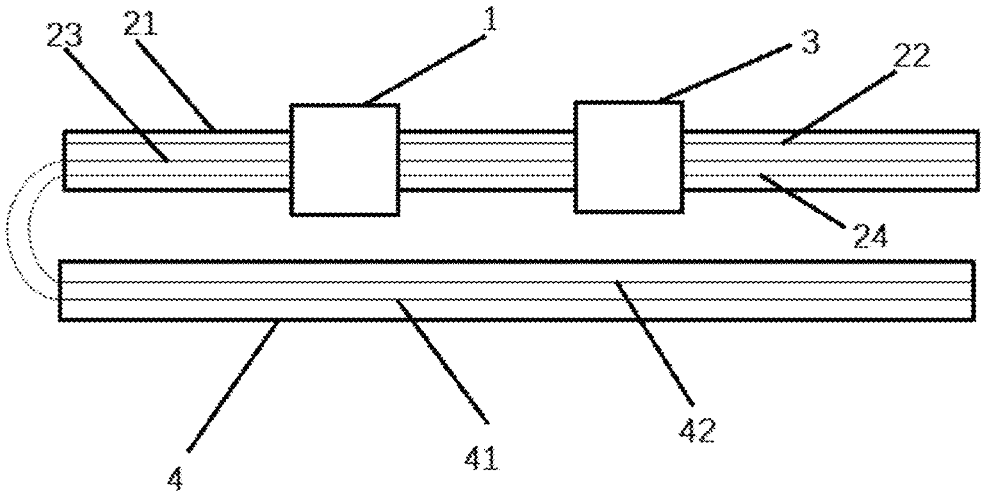
FIG. 6 is a structure block diagram of a lighting system of an example of the present disclosure.

The above track 2 and the lighting system controller 1 which have been connected, as well as at least one lighting unit 3 disposed on the track body 21 form a lighting system of an example of the present disclosure, a structure block diagram of which is shown in FIG. 6. The lighting unit 3 is disposed on the track body 21, the lighting unit 3 is electrically connected to the third conductive bar 23 to receive the power supply, and the lighting unit 3 is electrically connected to the first conductive bar 22 to receive the first control signal outputted by the first communication interface 106 and respond to the signal to be controlled for dimming and toning.

The lighting system further includes a superior track 4. The superior track 4 includes a fourth conductive bar 42 for transmitting a second control signal or a third control signal and a fifth conductive bar 41 for power supply. The fourth conductive bar 42 is electrically connected to the second conductive bar 24, and the fifth conductive bar 41 is electrically connected to the third conductive bar 23. At this point, the first conductive bar 22 and the second conductive bar 24 transmit the first control signal and the second control signal or the third control signal respectively, and the lighting unit 3 only accepts the first control signal transmitted from the first conductive bar 22. At this time, through transparent transmission, the lighting system controller 1 converts the second control signal or the third control signal on the second conductive bar 24 into the first control signal, and then transmits the first control signal to the first conductive bar 22 to control the lighting unit 3. In this example, the first control signal is a DALI control signal, the second control signal is a PWM control signal, and the third control signal is a 0-10 volts control signal.

The superior track 4 may be a part of an existing track lighting system. In a case where there is a need for extension, it may be impossible to purchase a track with the same structure as the original superior track 4, or it may be impossible to purchase a lighting unit 3 that can be installed on the original superior track 4. For example, if the superior track 4 is a PWM control system, but most of lamps on the market are of DALI-controlled lamps at present, then by connecting to the track 2 in this example, the new lighting unit 3 can be connected to the original track system. In this example, new DALI lamps can be installed on the track 2 provided in the present disclosure, and can be compatible with two control modes of PWM and 0-10 volts after being connected to the superior track 4. No matter which of the two control modes the original system has, it can be converted into a DALI control signal through the lighting system controller 1, then the newly added DALI track lights are connected to the same master of the original system for unified dimming and toning, and new tracks are laid on the premise of not changing the original track system so as to achieve unified management. In a case where there is no need for the original track system to unifiedly control a new device, the track 2, the lighting system controller 1 and the lighting unit 3 in this example can form a set of independently controlled lighting system, and the lighting system controller 1 can realize autonomous DALI control as the traditional track controller.

The purpose of the disclosure is to solve the problem that the tracks of different control protocols of the track lighting control systems cannot be jointly controlled.

In order to achieve the above purpose, the technical scheme adopted by the disclosure is to provide a lighting system controller, including: a power supply module, a processor, a control module, which is used for generating a first control signal or processing the first control signal, and a first communication interface, the first communication interface being connected to the control module and an external control bus, the controller further includes:

a second communication interface, being used to receive a second control signal or a third control signal;

a detection circuit, being connected to the second communication interface and the processor, the detection circuit outputs a determination signal to the processor according to a type of a signal received by the second communication interface; the processor performs subsequent processing according to the determination signal; if it is determined that the signal received by the second communication interface is the second control signal, then the detection circuit also converts the second control signal, and the processor receives a signal obtained after the detection circuit converting the second control signal, and then the processor converts the signal into a first control signal and transmits the first control signal to the control module; and an analytic circuit, being connected to the second communication interface and the processor, if it is determined that the signal received by the second communication interface is the third control signal, then the processor receives a signal obtained after the analytic circuit converting the third control signal, and then the processor converts the signal into a first control signal and transmits the first control signal to the control module;

upon second communication interface being input with the second control signal or the third control signal, the control module transmits the first control signal transmitted from the processor to the first communication interface, or otherwise, a first control signal generated by the control module itself is transmitted to the first communication interface.

Preferably, the second control signal is a PWM control signal, and the third control signal is a 0-10 volts control signal.

Preferably, the detection circuit includes an isolation circuit and a first conversion circuit, the second communication interface is connected to the isolation circuit, an input signal of the second communication interface is outputted at a PWM terminal after being processed by the isolation circuit, the PWM terminal outputs the determination signal to the processor, the first conversion circuit is connected to the PWM terminal and converts a signal of the PWM terminal into a signal that can be processed by the processor, and the signal is outputted from an output terminal ADC2.

Preferably, upon an output of the PWM terminal being a PWM waveform, it is determined that the input signal of the second communication interface is the second control signal, and upon the output of the PWM terminal being at a high level, it is determined that the input signal of the second communication interface is the third control signal.

Preferably, the isolation circuit includes a first optocoupler, a terminal of an input side of the first optocoupler is pulled up at a supply voltage through a first resistor, and is grounded through a first voltage regulator diode, and another terminal of the input side of the first optocoupler is connected to a collector of a first triode through a second resistor, a base of the first triode is connected to the second communication interface through a third resistor, an emitter of the first triode is grounded, a terminal of an output side of the first optocoupler is connected to a base of a second triode, a fourth resistor is connected to a high level and the base of the second triode, a fifth resistor is connected to a high level and a collector of the second triode, a sixth resistor and a first capacitor are connected in parallel between the collector of the second triode and an emitter of the second triode, a seventh resistor is connected between the collector of the second triode and the PWM terminal, and another terminal of the output side of the first optocoupler and the emitter of the second triode are grounded.

Preferably, the analytic circuit includes a first chip, the input signal of the second communication interface is inputted into the first chip and converted into a PWM signal, the first chip is connected to a terminal of an input side of a second optocoupler through an eighth resistor, another terminal of the input side of the second optocoupler is grounded, a ninth resistor is also connected between the terminal of the input side of the second optocoupler and the another terminal of the input side of the second optocoupler, a terminal of an output side of the second optocoupler is connected to a second conversion circuit and also pulled up at a high level through an eleventh resistor, another terminal of the output side of the second optocoupler is grounded, the second conversion circuit converts a received signal into a signal that can be processed by the processor, and the signal is outputted by an output terminal ADC1.

Preferably, the first conversion circuit and the second conversion circuit have the same structure and each include an MOS transistors, a gate of the MOS transistor is connected to the PWM terminal or the terminal of the output side of the second optocoupler, a twelfth resistor is connected between the gate of the MOS transistor and the ground, a source of the MOS transistor is grounded, a drain of the MOS transistor is pulled up at a high level through a thirteenth resistor, also, a fourteenth resistor, a fifteenth resistor and a sixteenth resistor are connected in series in sequence between the drain of the MOS transistor and the output terminal ADC2 of the first conversion circuit or the output terminal ADC1 of the second conversion circuit, a terminal of a second capacitor is connected to a connection point of the fourteenth resistor and the fifteenth resistor and another terminal of the second capacitor is grounded, a terminal of a third capacitor is connected to a connection point of the fifteenth resistor and the sixteenth resistor and another terminal of the third capacitor is grounded, and a fourth capacitor and a fifth capacitor are connected in parallel between the ground and the output terminal ADC2 of the first conversion circuit or the output terminal ADC1 of the second conversion circuit.

Preferably, the first control signal is a DALI signal.

The present disclosure also provides a track, the track includes a track body and a first conductive bar, a second conductive bar and a third conductive bar arranged along an extension direction of the track body, the first conductive bar is configured to transmit a first control signal, the second conductive bar is configured to transmit a second control signal and a third control signal, the third conductive bar is configured for power supply, the lighting system controller as mentioned above is connected to the track body, the first communication interface is electrically connected to the first conductive bar, and the second communication interface is electrically connected to the second conductive bar.

Preferably, the second control signal is a PWM control signal, and the third control signal is a 0-10 volts control signal.

Preferably, the first control signal is a DALI control signal.

The present disclosure also provides a lighting system, including the track as mentioned above, the lighting system controller as mentioned above and at least one lighting unit, the lighting system controller is connected to the track body, the first communication interface is electrically connected to the first conductive bar, the second communication interface is electrically connected to the second conductive bar, the lighting unit is disposed on the track body, the lighting unit is electrically connected to the third conductive bar to receive the power supply, and the lighting unit is electrically connected to the first conductive bar to receive a first control signal outputted by the first communication interface and respond to the first control signal.

Preferably, the lighting system further includes a superior track, the superior track includes a fourth conductive bar for transmitting a second control signal or a third control signal, and the fourth conductive bar is electrically connected to the second conductive bar.

Preferably, the second control signal is a PWM control signal, the third control signal is a 0-10 volts control signal, and the first control signal is a DALI control signal; upon the fourth conductive bar being applied with the second control signal or the third control signal, the lighting system controller converts the second control signal or the third control signal into the first control signal to control the lighting unit, or otherwise the lighting system controller directly generates the first control signal to control the lighting unit.

The lighting system controller provided in the present disclosure not only retains the functions of the original controller to directly control lamps such as dimming and color-tuning, but also has an additional input interface which enables the lighting system controller to be connected to an existing track lighting system. During connection, a control signal line of the existing system is connected to a second communication interface. Through identification of the input signal of the second communication interface, two control systems of PWM control and 0-10 volts control can be compatible at the same time, and the input signal is converted into a DALI control signal. Therefore, the DALI lamp which is newly connected to the system can also be used, and is controlled simultaneously with the lamp in the original system. If it is not connected to the upstream line, then the controller will control its own track. The lighting system controller provided in the present disclosure can not only be connected to the existing track system to realize unified arrangement and operation of the tracks in the whole house, but can also be used as a controller separately, thereby meeting different needs of different customers.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an disclosure-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above description of the examples of the present disclosure is for illustration and description, but is not intended to exhaust or limit the present disclosure to the specific form disclosed. It is clear that, many modifications and changes may be made, and those modifications and changes may be obvious to those skilled in the art and should be included within the scope of the present disclosure.

The invention claimed is:

1. A lighting system controller, comprising a power supply module, a processor, a control module, which is used for generating a first control signal or processing the first control signal, and a first communication interface, the first communication interface being connected to the control module and an external control bus, wherein the controller further comprises:

a second communication interface being used to receive a second control signal or a third control signal;

a detection circuit being connected to the second communication interface and the processor, wherein:

the detection circuit outputs a determination signal to the processor according to a type of a signal received by the second communication interface;

the processor performs subsequent processing according to the determination signal;

when it is determined that the signal received by the second communication interface is the second control signal, the detection circuit converts the second control signal, and the processor receives a signal obtained after the detection circuit converting the second control signal, and the processor converts the signal into a first control signal and transmits the first control signal to the control module; and an analytic circuit being connected to the second communication interface and the processor, wherein:

when it is determined that the signal received by the second communication interface is the third control signal, the processor receives a signal obtained after the analytic circuit converting the third control signal, and the processor converts the signal into a first control signal and transmits the first control signal to the control module;

upon second communication interface being input with the second control signal or the third control signal, the control module transmits the first control signal transmitted from the processor to the first communication interface, or otherwise, a first control signal generated by the control module itself is transmitted to the first communication interface.

2. The lighting system controller according to claim 1, wherein the second control signal is a PWM control signal, and the third control signal is a 0-10 volts control signal.

3. The lighting system controller according to claim 2, wherein:

the detection circuit comprises an isolation circuit and a first conversion circuit, the second communication interface is connected to the isolation circuit, an input signal of the second communication interface is outputted at a PWM terminal after being processed by the isolation circuit, the PWM terminal outputs the determination signal to the processor, the first conversion circuit is connected to the PWM terminal and converts a signal of the PWM terminal into a signal that can be processed by the processor, and the signal is outputted from an output terminal ADC2.

4. The lighting system controller according to claim 3, wherein:

upon an output of the PWM terminal being a PWM waveform, it is determined that the input signal of the second communication interface is the second control signal, and upon the output of the PWM terminal being at a high level, it is determined that the input signal of the second communication interface is the third control signal.

5. The lighting system controller according to claim 4, wherein:

the isolation circuit comprises a first optocoupler, a terminal of an input side of the first optocoupler is pulled up at a supply voltage through a first resistor, and is grounded through a first voltage regulator diode, and another terminal of the input side of the first optocoupler is connected to a collector of a first triode through a second resistor, and wherein a base of the first triode is connected to the second communication interface through a third resistor, an emitter of the first triode is grounded, a terminal of an output side of the first optocoupler is connected to a base of a second triode, a fourth resistor is connected to a high level and the base of the second triode, a fifth resistor is connected to a high level and a collector of the second triode, a sixth resistor and a first capacitor are connected in parallel between the collector of the second triode and an emitter of the second triode, a seventh resistor is connected between the collector of the second triode and the PWM terminal, and another terminal of the output side of the first optocoupler and the emitter of the second triode are grounded.

6. The lighting system controller according to claim 4, wherein:

the analytic circuit comprises a first chip, the input signal of the second communication interface is inputted into the first chip and converted into a PWM signal, the first chip is connected to a terminal of an input side of a second optocoupler through an eighth resistor, another terminal of the input side of the second optocoupler is grounded, a ninth resistor is also connected between the terminal of the input side of the second optocoupler and the another terminal of the input side of the second optocoupler, and wherein a terminal of an output side of the second optocoupler is connected to a second conversion circuit and also pulled up at a high level through an eleventh resistor, another terminal of the output side of the second optocoupler is grounded, the second conversion circuit converts a received signal into a signal that can be processed by the processor, and the signal is outputted by an output terminal ADC1.

7. The lighting system controller according to claim 6, wherein:

the first conversion circuit and the second conversion circuit have the same structure and each comprise an MOS transistors, a gate of the MOS transistor is connected to the PWM terminal or the terminal of the output side of the second optocoupler, a twelfth resistor is connected between the gate of the MOS transistor and the ground, a source of the MOS transistor is grounded, a drain of the MOS transistor is pulled up at a high level through a thirteenth resistor, a fourteenth resistor, a fifteenth resistor and a sixteenth resistor are connected in series in sequence between the drain of the MOS transistor and the output terminal ADC2 of the first conversion circuit or the output terminal ADC1 of the second conversion circuit, a terminal of a second capacitor is connected to a connection point of the fourteenth resistor and the fifteenth resistor and another terminal of the second capacitor is grounded, a terminal of a third capacitor is connected to a connection point of the fifteenth resistor and the sixteenth resistor and another terminal of the third capacitor is grounded, and a fourth capacitor and a fifth capacitor are connected in parallel between the ground and the output terminal ADC2 of the first conversion circuit or the output terminal ADC1 of the second conversion circuit.

8. The lighting system controller according claim 1, wherein the first control signal is a DALI signal.

9. A track, comprising:

a track body and a first conductive bar, a second conductive bar and a third conductive bar arranged along an extension direction of the track body, wherein:

the first conductive bar is configured to transmit a first control signal, the second conductive bar is configured to transmit a second control signal and a third control signal, the third conductive bar is configured for power supply, and a lighting system controller is connected to the track body, wherein the lighting system controller comprises a power supply module, a processor, a control module, which is used for generating a first control signal or processing the first control signal, and a first communication interface, the first communication interface being connected to the control module and an external control bus, wherein the controller further comprises:

a detection circuit being connected to the second communication interface and the processor, wherein:

the detection circuit outputs a determination signal to the processor according to a type of a signal received by the second communication interface;

the processor performs subsequent processing according to the determination signal;

when it is determined that the signal received by the second communication interface is the second control signal, the detection circuit converts the second control signal, and the processor receives a signal obtained after the detection circuit converting the second control signal, and the processor converts the signal into a first control signal and transmits the first control signal to the control module; and an analytic circuit being connected to the second communication interface and the processor, wherein:

when it is determined that the signal received by the second communication interface is the third control signal, the processor receives a signal obtained after the analytic circuit converting the third control signal, and the processor converts the signal into a first control signal and transmits the first control signal to the control module;

upon second communication interface being input with the second control signal or the third control signal, the control module transmits the first control signal transmitted from the processor to the first communication interface, or otherwise, a first control signal generated by the control module itself is transmitted to the first communication interface, and the first communication interface is electrically connected to the first conductive bar, and the second communication interface is electrically connected to the second conductive bar.

10. The track according to claim 9, wherein the second control signal is a PWM control signal, and the third control signal is a 0-10 volts control signal.

11. The track according to claim 10, wherein the first control signal is a DALI control signal.

12. A lighting system, comprising:

a track, a lighting system controller and at least one lighting unit, wherein the lighting system controller comprises a power supply module, a processor, a control module, which is used for generating a first control signal or processing the first control signal, and a first communication interface, the first communication interface being connected to the control module and an external control bus, wherein the controller further comprises:

a detection circuit being connected to the second communication interface and the processor, wherein:

the detection circuit outputs a determination signal to the processor according to a type of a signal received by the second communication interface;

the processor performs subsequent processing according to the determination signal;

when it is determined that the signal received by the second communication interface is the second control signal, the detection circuit converts the second control signal, and the processor receives a signal obtained after the detection circuit converting the second control signal, and the processor converts the signal into a first control signal and transmits the first control signal to the control module; and an analytic circuit being connected to the second communication interface and the processor, wherein:

when it is determined that the signal received by the second communication interface is the third control signal, the processor receives a signal obtained after the analytic circuit converting the third control signal, and the processor converts the signal into a first control signal and transmits the first control signal to the control module;

upon second communication interface being input with the second control signal or the third control signal, the control module transmits the first control signal transmitted from the processor to the first communication interface, or otherwise, a first control signal generated by the control module itself is transmitted to the first communication interface, and the track comprises a track body and a first conductive bar, a second conductive bar and a third conductive bar arranged along an extension direction of the track body, wherein:

the first conductive bar is configured to transmit a first control signal, the second conductive bar is configured to transmit a second control signal and a third control signal, the third conductive bar is configured for power supply, and the lighting system controller is connected to the track body, and the first communication interface is electrically connected to the first conductive bar, and the second communication interface is electrically connected to the second conductive bar, and the lighting system controller is connected to the track body, the first communication interface is electrically connected to the first conductive bar, the second communication interface is electrically connected to the second conductive bar, the lighting unit is disposed on the track body, the lighting unit is electrically connected to the third conductive bar to receive the power supply, and the lighting unit is electrically connected to the first conductive bar to receive a first control signal outputted by the first communication interface and respond to the first control signal.

13. The lighting system according to claim 12, wherein the lighting system further comprises a superior track, the superior track comprises a fourth conductive bar for transmitting a second control signal or a third control signal, and the fourth conductive bar is electrically connected to the second conductive bar.

14. The lighting system according to claim 12, wherein:

the second control signal is a PWM control signal, the third control signal is a 0-10 volts control signal, and the first control signal is a DALI control signal; upon the fourth conductive bar being applied with the second control signal or the third control signal, the lighting system controller converts the second control signal or the third control signal into the first control signal to control the lighting unit, or otherwise the lighting system controller directly generates the first control signal to control the lighting unit.

* * * * *